United States Patent
Amsterdam et al.

(10) Patent No.: US 10,431,225 B2
(45) Date of Patent: Oct. 1, 2019

(54) SPEAKER IDENTIFICATION ASSISTED BY CATEGORICAL CUES

(71) Applicant: INTERNATIONAL BUSINESS MACHINES CORPORATION, Armonk, NY (US)

(72) Inventors: Jeffrey D. Amsterdam, Roswell, GA (US); Aaron K. Baughman, Silver Spring, MD (US); Stephen C. Hammer, Marietta, GA (US); Mauro Marzorati, Lutz, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/476,194

(22) Filed: Mar. 31, 2017

(65) Prior Publication Data
US 2018/0286412 A1 Oct. 4, 2018

(51) Int. Cl.
| | |
|---|---|
| G10L 25/78 | (2013.01) |
| B60T 17/22 | (2006.01) |
| G06F 9/54 | (2006.01) |
| G10L 17/06 | (2013.01) |
| G06F 17/27 | (2006.01) |
| G10L 15/26 | (2006.01) |
| G10L 17/12 | (2013.01) |

(52) U.S. Cl.
CPC .......... *G10L 17/06* (2013.01); *G06F 17/275* (2013.01); *B60T 17/22* (2013.01); *G06F 9/543* (2013.01); *G10L 15/26* (2013.01); *G10L 17/12* (2013.01); *G10L 25/78* (2013.01)

(58) Field of Classification Search
CPC .......... G10L 25/78; B60T 17/22; G06F 9/543
USPC .............................. 704/235; 701/2
See application file for complete search history.

(56) References Cited

U.S. PATENT DOCUMENTS

| | | | |
|---|---|---|---|
| 8,612,224 B2 | 12/2013 | Breslin et al. | |
| 9,401,140 B1 * | 7/2016 | Weber | G10L 15/00 |
| 2004/0260535 A1 * | 12/2004 | Chen | G06F 9/543 |
| | | | 704/9 |
| 2014/0074467 A1 * | 3/2014 | Ziv | G10L 25/78 |
| | | | 704/235 |
| 2015/0336578 A1 * | 11/2015 | Lord | B60T 17/22 |
| | | | 701/2 |

(Continued)

OTHER PUBLICATIONS

"Speech analysis for speaker Diarization and spoken language Identification", Shodhganga, Annamalai University, 2010.*

(Continued)

*Primary Examiner* — Farzad Kazeminezhad
(74) *Attorney, Agent, or Firm* — Chris K. McLane, Esq.; George S. Blasiak, Esq.; Heslin Rothenberg Farley & Mesiti PC (57) ABSTRACT

Methods, computer program products, and systems are presented. The methods include, for instance: obtaining a media file including a speech by one or more speaker. The language of the speech is identified and biographic data of a speaker of the speech is generated by analyzing semantics and vocal characteristics of the speech. The speaker is diarized and confidence in a resulting speaker label is evaluated against a threshold. The speaker label is adjusted with the language of the speech and biographic data of the speaker and produced as speaker metadata of the media file.

18 Claims, 5 Drawing Sheets

(56) References Cited

U.S. PATENT DOCUMENTS

2016/0179831 A1    6/2016    Gruber et al.
2016/0343373 A1    11/2016    Ziv et al.

OTHER PUBLICATIONS

Mell, Peter, et al., "The NIST Definition of Cloud Computing", NIST Special Publication 800-145, Sep. 2011, Gaithersburg, MD, 7 pgs.

Poignant, Johann, et al., "Unsupervised Speaker Identification in TV Broadcast Based on Written Names", IEEE/ACM Transactions on Audio, Speech, and Language Processing, vol. 23, No. 1, Jan. 2015, 12 pgs.

Friedland, Gerald, et al., "Live Speaker Identification in Conversations", ACM MM 2008, Oct. 26-31, 2008, Vancouver, British Columbia, Canada, pp. 1017-1018.

Pardo, Jose' M., et al., "Speaker Diarization for Multiple-Distant-Microphone Meetings Using Several Sources of Information", IEEE Transactions on Computers, vol. 56, No. 9, Sep. 2007, pp. 1212-1224.

Woo, Daniel N., et al., "Unsupervised Speaker Identification for TV News", IEEE Computer Society, IEEE MM, Oct.-Dec. 2016 issue, pp. 50-58.

\* cited by examiner

SPEAKER IDENTIFICATION ASSISTED BY CATEGORICAL CUES

TECHNICAL FIELD

The present disclosure relates to speaker identification technology, and more particularly to methods, computer program products, and systems for improving accuracy of speaker identification by use of various categorical cues.

BACKGROUND

Speaker recognition has many applications and became increasingly prevalent in numerous voice-based communication including entertainment, marketing and customer services, medical transcription, etc. In conventional speaker identification, speakers are often misidentified due to lack of context information on the speakers and speeches, and due to limited amount of information conveyed with speaker labels.

SUMMARY

The shortcomings of the prior art are overcome, and additional advantages are provided, through the provision, in one aspect, of a method. The method for identifying one or more speaker from a media file includes, for example: obtaining, by one or more processor, a media file having a speech by one or more speaker; identifying the language of the speech by analyzing semantics of the language; generating speaker biographic data in preconfigured categories by analyzing vocal characteristics and frequently used words of the speech; diarizing the media file by adjusting boundaries of segments of the media file and identifying respective speaker for each segment; evaluating a confidence associated with a speaker as identified from the diarizing; adjusting a speaker label corresponding to the speaker to include the speaker, the language, and the speaker biographic data, responsive to determining that the confidence from the evaluating satisfies a preconfigured confidence threshold; and producing the speaker label resulting from the adjusting as speaker metadata for a segment corresponding to the speaker.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
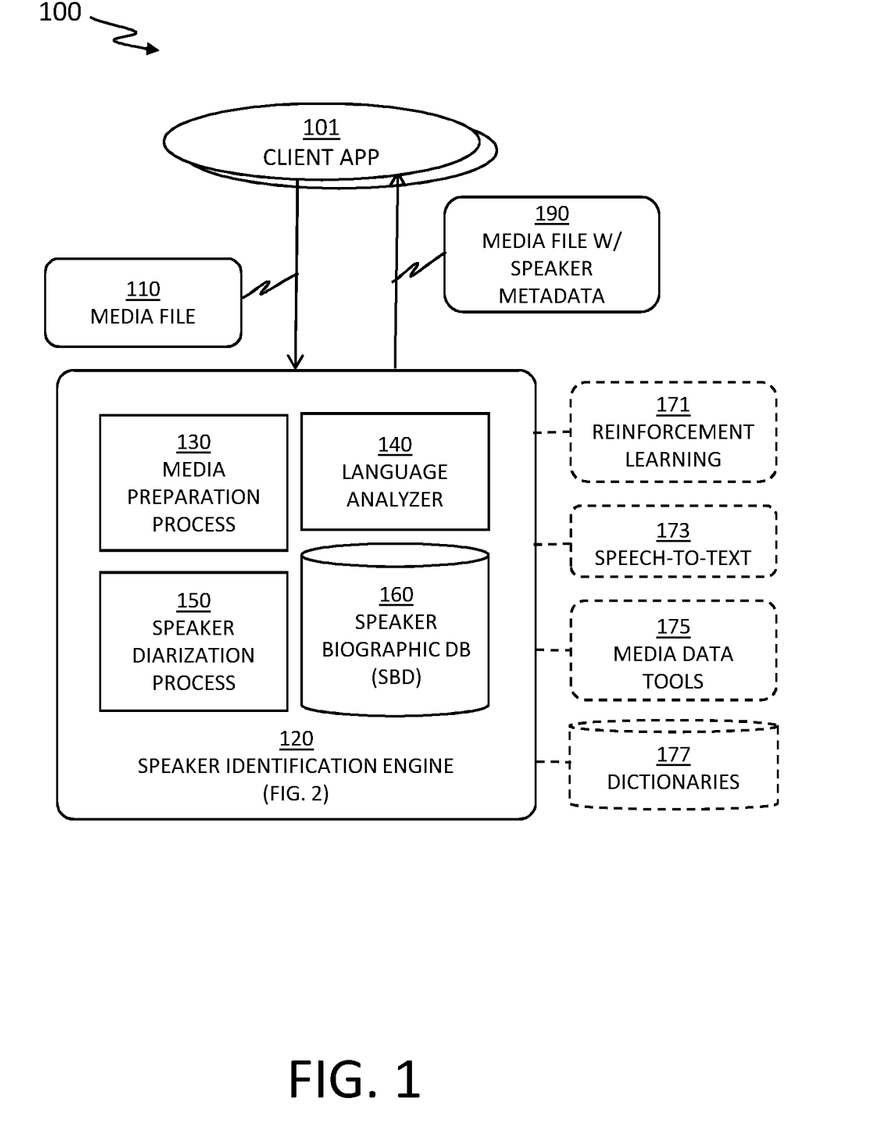
FIG. 1 depicts a system for speaker identification assisted by categorical cues, in accordance with one or more embodiments set forth herein.

FIG. 1 depicts a system 100 for speaker identification assisted by categorical cues, in accordance with one or more embodiments set forth herein.

The system 100 for speaker identification includes a speaker identification engine 120. One or more client application provides services relevant to media files to users. A client application 101 of the one or more client application sends a media file 110 to the speaker identification engine 120 and receives a media file with speaker metadata 190 as generated by the speaker identification engine 120. Speaker metadata in the media file with speaker metadata 190 may include a speaker identity, a language spoken by the speaker, speaker biographic data discernable from voice biometrics, etc.

The speaker identification engine 120 includes a media preparation process 130, a language analyzer 140, a speaker diarization process 150, and a speaker biographic database (SBD) 160. The speaker identification engine 120 utilizes various external tools including a reinforcement learning tool 171, a speech-to-text tool 173, media data tools 175, and dictionaries 177, which are presently available.

The media preparation process 130 of the speaker identification engine 120 prepares the media file 110 by converting and dividing the media file 110 into media file portions. The media preparation process 130 may have a preconfigured unit size for the media file portions. The speaker segmentation process 130 may utilize the media data tools 175 in converting and dividing the media file 110. The media data tools are readily available and external to the speaker identification engine 120. The media preparation process 130 indicates a functionality of the speaker identification engine 120 and may or may not be implemented as a separate program process. Further description of the media preparation process 130 is presented in description of block 210 of FIG. 2.

The language analyzer 140 of the speaker identification engine 120 analyzes one or more language spoken in the media file 110 by use of the speech-to-text tool 173 in transcribing speech of the media file 110 and the dictionaries 177 of numerous candidate languages in identifying the language spoken in the speech of the media file 110. The language analyzer 140 indicates a functionality of the speaker identification engine 120 and may or may not be implemented as a separate program process. Further description of the language analyzer 140 is presented in description of block 220 of FIG. 2.

The speaker biographic database (SBD) 160 of the speaker identification engine 120 stores certain biographic data of speakers in the media file 110 that may be determined from voice biometric including age, gender, ethnic group, etc. Along with the language data generated from the language analyzer 140, the SBD 160 data categories are utilized in improving accuracy of the speaker identification, and in enhancing the media file 110 with the speaker metadata. The SBD 160 indicates a functional component and related process generating the SBD 160 of the speaker identification engine 120 and may or may not be implemented as a separate program process and/or data component. Further description of the SBD 160 is presented in description of block 230 of FIG. 2.

The speaker diarization process 150 of the speaker identification engine 120 diarizes the media file portions as prepared by the media preparation process 130 by identifying respective speakers of the media file portions. The speaker diarization process 150 may associate the speaker identities with respective confidence. The speaker diarization process 150 indicates a functionality of the speaker identification engine 120 and may or may not be implemented as a separate program process. Further description of the speaker diarization process 150 is presented in description of block 240 of FIG. 2.

Figure 2:
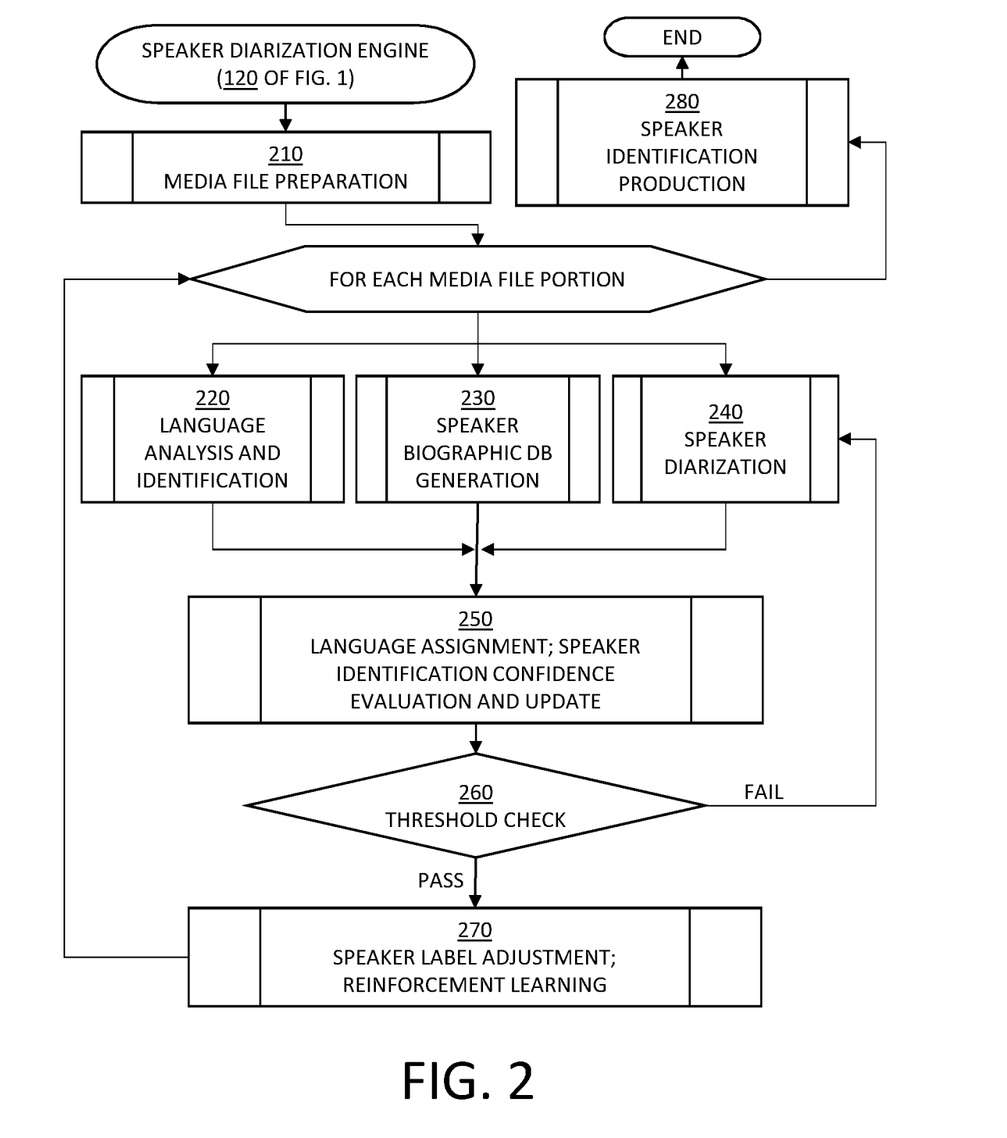
FIG. 2 depicts a flowchart performed by the speaker identification engine of the system, in accordance with one or more embodiments set forth herein.

FIG. 2 depicts a flowchart performed by the speaker identification engine 120 of FIG. 1, in accordance with one or more embodiments set forth herein.

In block 210, the speaker identification engine 120 prepares a media file by dividing the media file into smaller portions and/or by converting the media file into another format suitable for implementation details of the speaker identification engine 120. Then the speaker identification engine 120 proceeds with block 220.

In certain embodiments of the present invention, the media file may be in .M3U8 format that is a series of .TS files. Multiple video streaming files in .TS format may be converted into one .M3U8 file, which is referred to as a playlist. The media file is first converted into .WAV format and then segmented into portions up to 100 MB unit. The speaker identification engine 120 may utilize media data tools available such as FFMPEG package. The media file may be an on-line live stream and the speaker identification engine 120 may perform blocks 210 through 280 in real time.

The speaker identification engine 120 concurrently performs blocks 220, 230 and 240 for each media file portion as prepared in block 210. Subsequent to perform blocks 220 through 270 for all media file portions, synchronously or asynchronously, the speaker identification engine 120 proceeds with block 280.

In block 220, the speaker identification engine 120 analyzes a language of the media file portion against a predetermined set of candidate languages supported by the speaker identification engine 120 and identifies the language used in the media file portion. Then the speaker identification engine 120 proceeds with block 250.

In certain embodiments of the present invention, the speaker identification engine 120 have the media file portion automatically transcribed in the candidate languages by use of speech-to-text transcription tools. Then the speaker identification engine 120 looks up respective dictionaries of the candidate languages for sampled words from the transcriptions in candidate languages. Based on the result from the dictionary, the speaker identification engine 120 identifies one of the candidate language that has the most hit for the transcribed words from the media file portion as the language of the media file portion. Based on a number of dictionary hits, the speaker identification engine 120 may associate a confidence value in identifying the language of the media file portion.

In certain embodiments of the present invention, the speaker identification engine 120 may obtain an input identifying the language of the media file portion and the confidence associated with the language identity from a human user. The speaker identification engine 120 may provide a user interface on the transcript presented to users such as a top down menu drops from a text block as selected and right-clicked by a user, from which the user may select from a list of candidate languages and confidence value in 0.10/0.25/0.33 increment from 0.00 to 0.99.

In block 230, the speaker identification engine 120 generates a speaker biographic database (SBD) of the media file portion by analyzing vocal characteristics and frequently used words of speakers in the media file portion against a preconfigured speaker biographic features in terms of vocal characteristics and frequently used words respective to certain age group, gender, ethnic group, etc. Accordingly, the speaker identification engine 120 may determine biographic data the speakers from the media file portion based on analyzing the sounds and words of the media file portion and discovering certain sounds and words associated with the speaker biographic features. Then the speaker identification engine 120 proceeds with block 250.

In block 240, the speaker identification engine 120 diarizes the media file portion by identifying one or more speaker corresponding to the media file portion. The speaker identification engine 120 may further segment the media file portion such that one segment of a speech may be associated with one speaker. The speaker identification engine 120 may utilize changes in the speech in segmenting the media file portion and in identifying respective speakers for each segment. The speaker identification engine 120 generates speaker identifications including speaker labels and corresponding confidence. Then the speaker identification engine 120 proceeds with block 250.

In certain embodiments of the present invention where speaker identification engine 120 performs block 240 subsequent to block 260 due to a confidence less than the confidence threshold, the speaker identification engine 120 may adjust diarization boundaries by segmenting the media file portion further such that each segment may be properly identified with respective speakers. In determining new boundaries for segments and identifying the respective speakers, the speaker identification engine 120 utilizes the speaker biographic feature categories and the language assignment made available from blocks 230 and 250, respectively.

In block 250, the speaker identification engine 120 assigns the language of a speech in the media file portion based on the language identified from block 220 in combination of biographic data of the SBD from block 230. The speaker identification engine 120 subsequently measures confidence associated with the speaker identification from block 240 according to the assigned language in combination of biographic data of the SBD from block 230. Then the speaker identification engine 120 proceeds with block 260.

In certain embodiments of the present invention, the speaker identification engine 120 assigns the language as English based on the semantics analysis. The speaker identification engine 120 discovers that the portion of the media file demonstrates the vocal characteristics and frequently used words as previously established for a group of Caucasian female speakers of age 30-40, according to the SDB. The speaker identification engine 120 identifies the speaker with a speaker label "X" and a confidence 67%, indicating 0.67 probability value, is associated with the speaker identification from block 240. At block 250, the speaker identification engine 120 checks if the speaker label X fits the categories of English language spoken by a Caucasian female speaker of age 30-40, and evaluates and adjusts the confidence associated with the speaker identification from block 240, which may result in increased confidence in cases where known evidences of the speaker label X fits the language and biographic feature categories. Where known evidences the speaker label X does not match with the language and biographic feature categories, the speaker identification engine 120 may decrease the confidence from block 240. For example, if the speaker label X is known as an African-American male speaker of age 10-20 who speaks Spanish, the confidence associated with the speaker label X as produced from block 240 would be decreased by four (4) units, respective to the four types of mismatches. In certain embodiments of the present invention wherein the result from block 240 generates only a speaker label without confidence, the speaker identification engine 120 may quantify the confidence associated with the speaker label by use of the language and biographic feature categories.

In block 260, the speaker identification engine 120 determines whether or not the confidence in the speaker label from block 250 satisfies a preconfigured confidence threshold. If the speaker identification engine 120 determines that the confidence from block 250 is less than the preconfigured confidence threshold, then the speaker identification engine 120 loops back to block 240 in order to generate a new speaker label. If the speaker identification engine 120 determines that the confidence from block 250 is greater than or equal to the preconfigured confidence threshold, then the speaker identification engine 120 proceeds with block 270.

In certain embodiments of the present invention, the speaker identification engine 120 may configure varying values for the confidence threshold dependent on a type of application for which the speaker identification is used. For example, for a security system voice recognition, the confidence threshold may be 94% as the speaker identity is critically important to the functionality and the application, while closed captioning for an entertainment video clip may have the confidence threshold of 65%.

In block 270, the speaker identification engine 120 adjusts the speaker label with the language as assigned from block 250 and the speaker biographic feature as generated from block 230. The speaker identification engine 120 may further obtain human input for the purpose of reinforcement learning. Then the speaker identification engine 120 proceeds with a next medial file portion that had not been processed.

In block 280, the speaker identification engine 120 produces the speaker identification including the speaker identity, the language, and the speaker biographic data, as in the adjusted speaker labels from block 270 for all media file portions including. The speaker identification engine 120 attaches the speaker identification to audio stream of the media file as speaker metadata. Then the speaker identification engine 120 terminates processing the media file.

Certain embodiments of the present invention may offer various technical computing advantages, including providing speaker metadata for audio streams. By automatically re-segmenting a speech in a media file by the language of the speech and speaker biographic data, certain embodiments of the present invention improves accuracy in speaker identification as well as ensures a certain level of confidence in speaker identification as requested by client applications. The language of the speech is analyzed and semantically examined to identify which language is spoken by a speaker. Also by analyzing vocal characteristics, certain speaker biographic data is developed. Certain embodiments of the present invention generates speaker metadata enhancing conventional speaker label by use of the identified language and the speaker biographic data. Certain embodiments of the present invention may provide speaker identification services concurrently to a plurality of client applications by use of multithreading and/or multiprocessing for a plurality of media files/live streams. Certain embodiments of the present invention may be implemented by use of a cloud platform/data center, and the speaker identification services may be provided as a subscribed service for organizations running the client applications.

Figure 3:
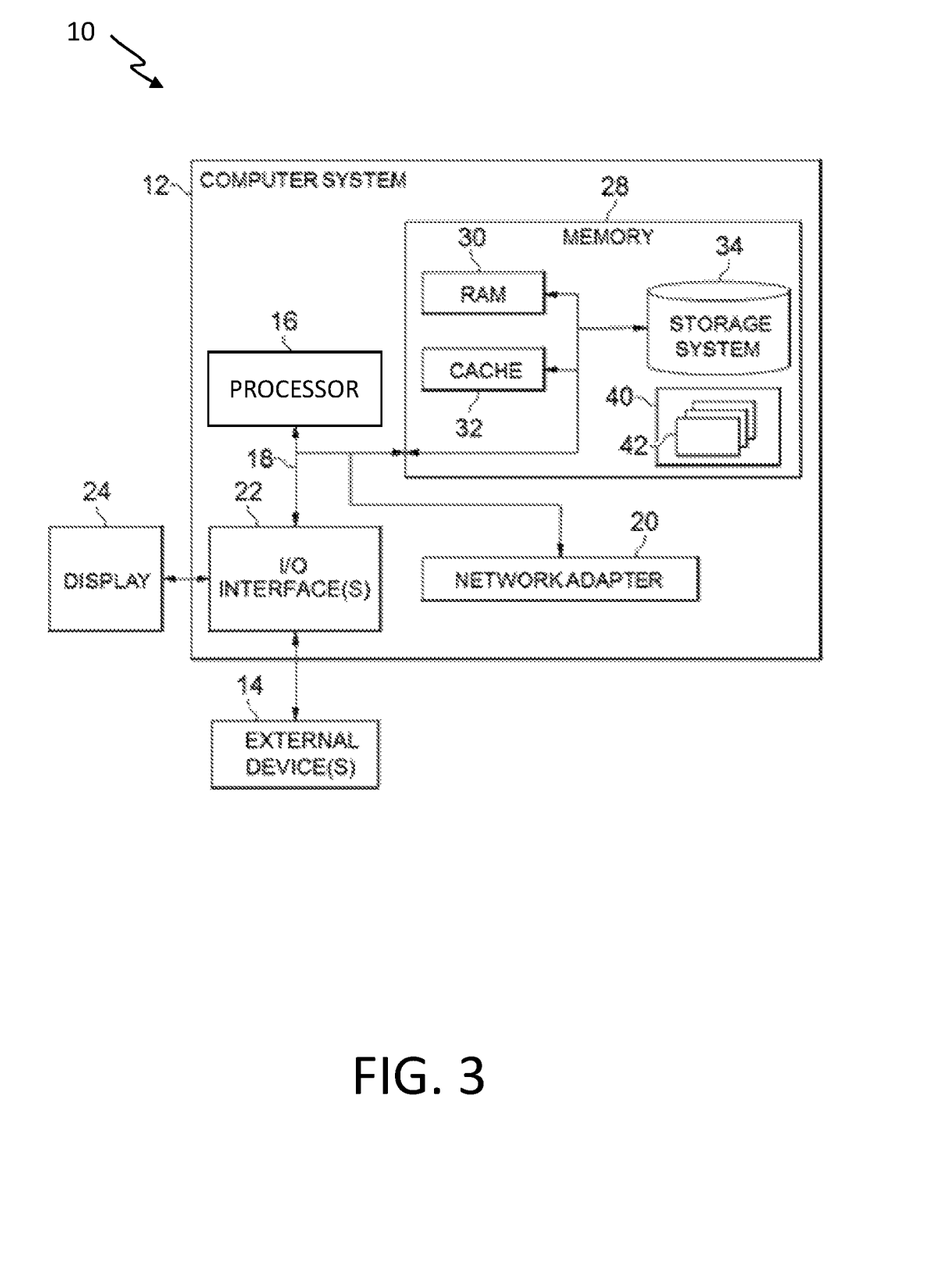
FIG. 3 depicts a cloud computing node according to an embodiment of the present invention.
Figure 4:
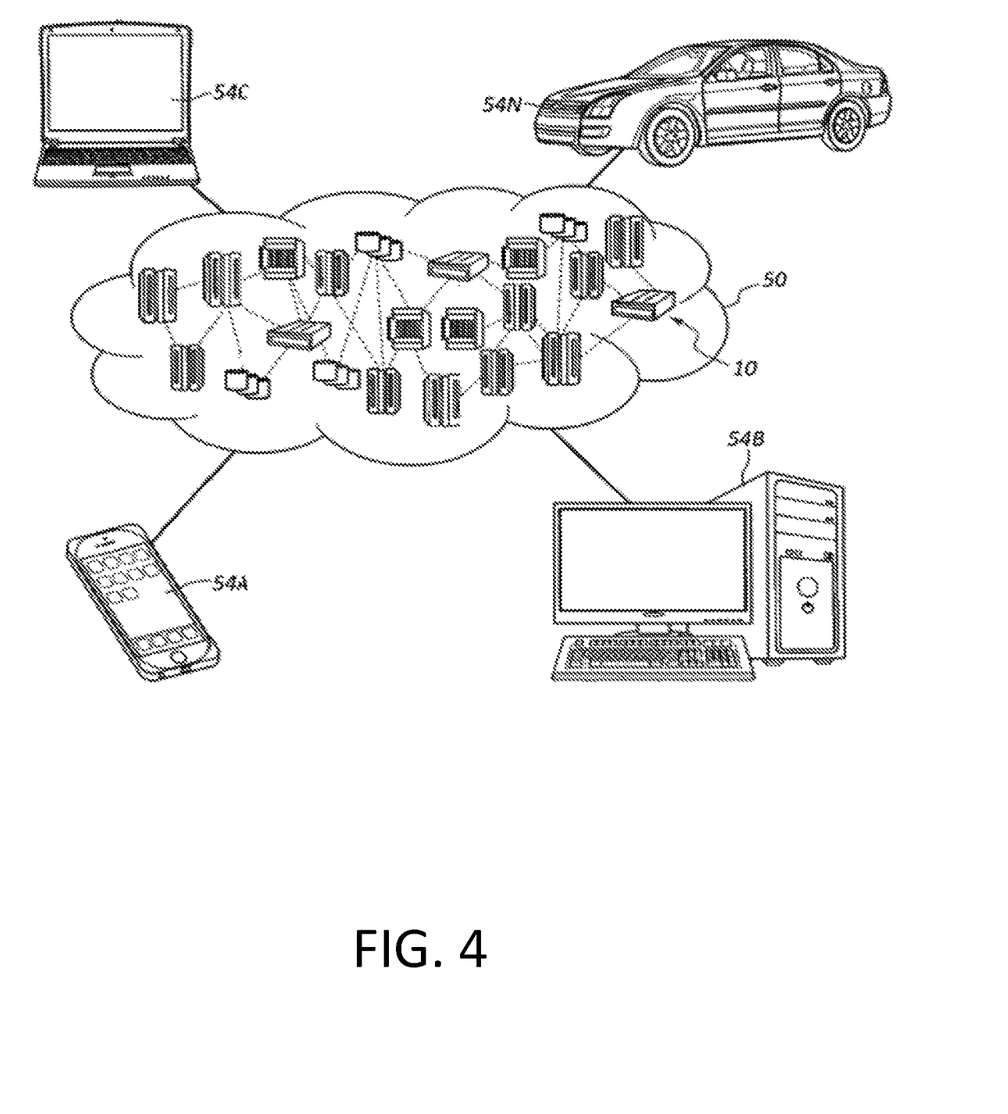
FIG. 4 depicts a cloud computing environment according to an embodiment of the present invention.
Figure 5:
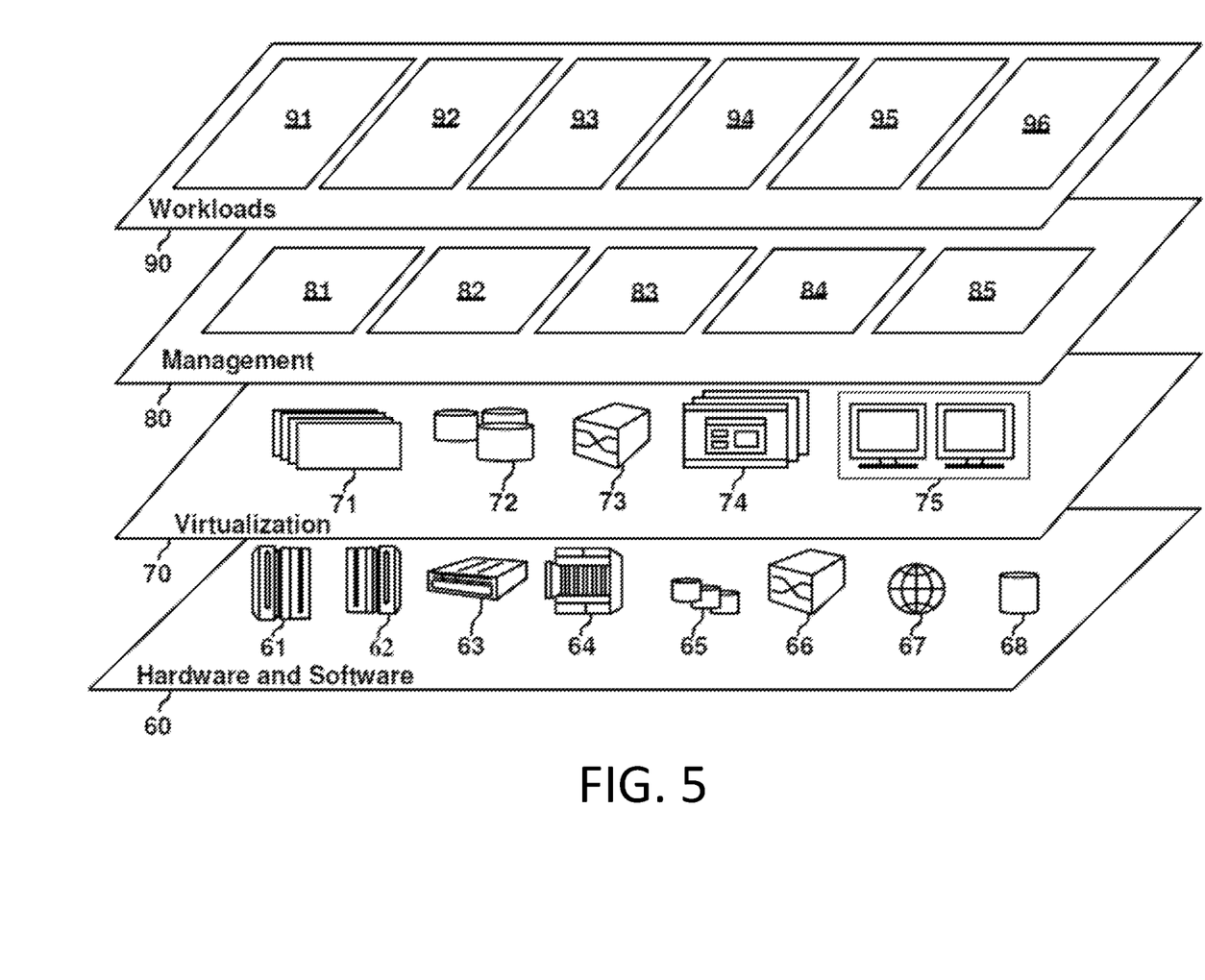
FIG. 5 depicts abstraction model layers according to an embodiment of the present invention.

FIGS. 3-5 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 3, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the speaker identification engine 120 of FIG. 1. Program processes 42, as in the speaker identification engine 120 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the speaker identification engine 96, as described herein. The processing components 96 can be understood as one or more program 40 described in FIG. 3.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

There is set forth herein A1. A computer implemented method for identifying one or more speaker from a media file, comprising: obtaining, by one or more processor, a media file having a speech by one or more speaker; identifying the language of the speech by analyzing semantics of the language; generating speaker biographic data in preconfigured categories by analyzing vocal characteristics and frequently used words of the speech; diarizing the media file by adjusting boundaries of segments of the media file and identifying respective speaker for each segment; evaluating a confidence associated with a speaker as identified from the diarizing; adjusting a speaker label corresponding to the speaker to include the speaker, the language, and the speaker biographic data, responsive to determining that the confidence from the evaluating satisfies a preconfigured confidence threshold; and producing the speaker label resulting from the adjusting as speaker metadata for a segment corresponding to the speaker. A2. The computer implemented method of A1, the identifying comprising: transcribing the speech into a text; identifying one or more word from the text; discovering the one or more word in a dictionary of a candidate language from respective dictionaries of a plurality of candidate languages; and assigning the candidate language as the language of the speech. A3. The computer implemented method of A1, the generating comprising: comparing the vocal characteristics and frequently used words of the speech with corresponding vocal characteristics and frequently used words of a plurality of speaker groups, wherein the preconfigured categories are selected from age, gender, ethnicity, and combinations thereof; discovering a match in the vocal characteristics and/or the frequently used words of the speech and of a certain speaker group; and setting the speaker biographic data with instances of the preconfigured categories for the certain speaker group from the discovering. A4. The computer implemented method of A1, further comprising: reiterating the diarizing, responsive to determining that the confidence from the evaluating fails to satisfy the preconfigured confidence threshold. A5. The computer implemented method of A1, the evaluating further comprising: increasing the confidence by a preconfigured unit responsive to ascertaining an evidence supporting that the speaker identified from the diarizing matches the speaker biographic data from the generating. A6. The computer implemented method of A1, the evaluating further comprising: increasing the confidence by a preconfigured unit responsive to ascertaining an evidence supporting that the speaker identified from the diarizing speaks the language from the identifying. A7. The computer implemented method of A1, further comprising: obtaining one or more input for reinforcement learning, wherein the one or more input may update the speaker label from the adjusting. B1. A computer program product comprising: a computer readable storage medium readable by one or more processor and storing instructions for execution by the one or more processor for performing a method for identifying one or more speaker from a media file, comprising: obtaining a media file having a speech by one or more speaker; identifying the language of the speech by analyzing semantics of the language; generating speaker biographic data in preconfigured categories by analyzing vocal characteristics and frequently used words of the speech; diarizing the media file by adjusting boundaries of segments of the media file and identifying respective speaker for each segment; evaluating a confidence associated with a speaker as identified from the diarizing; adjusting a speaker label corresponding to the speaker to include the speaker, the language, and the speaker biographic data, responsive to determining that the confidence from the evaluating satisfies a preconfigured confidence threshold; and producing the speaker label resulting from the adjusting as speaker metadata for a segment corresponding to the speaker. B2. The computer program product of B1, the identifying comprising: transcribing the speech into a text; identifying one or more word from the text; discovering the one or more word in a dictionary of a candidate language from respective dictionaries of a plurality of candidate languages; and assigning the candidate language as the language of the speech. B3. The computer program product of B1, the generating comprising: comparing the vocal characteristics and frequently used words of the speech with corresponding vocal characteristics and frequently used words of a plurality of speaker groups, wherein the preconfigured categories are selected from age, gender, ethnicity, and combinations thereof; discovering a match in the vocal characteristics and/or the frequently used words of the speech and of a certain speaker group; and setting the speaker biographic data with instances of the preconfigured categories for the certain speaker group from the discovering. B4. The computer program product of B1, further comprising: reiterating the diarizing, responsive to determining that the confidence from the evaluating fails to satisfy the preconfigured confidence threshold. B5. The computer program product of B1, the evaluating further comprising: increasing the confidence by a preconfigured unit responsive to ascertaining an evidence supporting that the speaker identified from the diarizing matches the speaker biographic data from the generating. B6. The computer program product of B1, the evaluating further comprising: increasing the confidence by a preconfigured unit responsive to ascertaining an evidence supporting that the speaker identified from the diarizing speaks the language from the identifying. B7. The computer program product of B1, further comprising: obtaining one or more input for reinforcement learning, wherein the one or more input may update the speaker label from the adjusting. C1. A system comprising: a memory; one or more processor in communication with memory; and program instructions executable by the one or more processor via the memory to perform a method for identifying one or more speaker from a media file, comprising: obtaining a media file having a speech by one or more speaker; identifying the language of the speech by analyzing semantics of the language; generating speaker biographic data in preconfigured categories by analyzing vocal characteristics and frequently used words of the speech; diarizing the media file by adjusting boundaries of segments of the media file and identifying respective speaker for each segment; evaluating a confidence associated with a speaker as identified from the diarizing; adjusting a speaker label corresponding to the speaker to include the speaker, the language, and the speaker biographic data, responsive to determining that the confidence from the evaluating satisfies a preconfigured confidence threshold; and producing the speaker label resulting from the adjusting as speaker metadata for a segment corresponding to the speaker. C2. The system of C1, the identifying comprising: transcribing the speech into a text; identifying one or more word from the text; discovering the one or more word in a dictionary of a candidate language from respective dictionaries of a plurality of candidate languages; and assigning the candidate language as the language of the speech. C3. The system of C1, the generating comprising: comparing the vocal characteristics and frequently used words of the speech with corresponding vocal characteristics and frequently used words of a plurality of speaker groups, wherein the preconfigured categories are selected from age, gender, ethnicity, and combinations thereof; discovering a match in the vocal characteristics and/or the frequently used words of the speech and of a certain speaker group; and setting the speaker biographic data with instances of the preconfigured categories for the certain speaker group from the discovering. C4. The system of C1, further comprising: reiterating the diarizing, responsive to determining that the confidence from the evaluating fails to satisfy the preconfigured confidence threshold. C5. The system of C1, the evaluating further comprising: increasing the confidence by a preconfigured unit responsive to ascertaining an evidence supporting that the speaker identified from the diarizing matches the speaker biographic data from the generating, or another evidence supporting that the speaker identified from the diarizing speaks the language from the identifying, respectively per evidence. C6. The system of C1, further comprising: obtaining one or more input for reinforcement learning, wherein the one or more input may update the speaker label from the adjusting. The preconfigured categories selected from age, gender, ethnicity, and combinations thereof can be regarded to be preconfigured demographic categories.

What is claimed is:

1. A computer implemented method for identifying one or more speaker from a media file, comprising:
obtaining, by one or more processor, a media file having a speech by one or more speaker;
identifying the language of the speech by analyzing semantics of the language;
generating speaker biographic data in preconfigured categories by analyzing vocal characteristics and frequently used words of the speech;
diarizing the media file by adjusting boundaries of segments of the media file and identifying respective speaker for each segment;
evaluating a confidence associated with a speaker as identified from the diarizing;
adjusting a speaker label corresponding to the speaker to include the speaker, the language, and the speaker biographic data, responsive to determining that the confidence from the evaluating satisfies a preconfigured confidence threshold;
producing the speaker label resulting from the adjusting as speaker metadata for a segment corresponding to the speaker, wherein the generating includes comparing frequently used words of the speech with corresponding vocal characteristics and frequently used words of a plurality of speaker groups, wherein the preconfigured categories are preconfigured demographic categories;
discovering a match in the frequently used words of the speech and of a certain speaker group of the plurality of speaker groups; and
including in the speaker biographic data biographic feature data of a first preconfigured category of the preconfigured categories for the certain speaker group based on the discovering.

2. The computer implemented method of claim 1, the identifying comprising: transcribing the speech into a text; identifying one or more word from the text; discovering the one or more word in a dictionary of a candidate language from respective dictionaries of a plurality of candidate languages; and assigning the candidate language as the language of the speech.

3. The computer implemented method of claim 1, further comprising: reiterating the diarizing, responsive to determining that the confidence from the evaluating fails to satisfy the preconfigured confidence threshold.

4. The computer implemented method of claim 1, the evaluating further comprising: increasing the confidence by a preconfigured unit responsive to ascertaining an evidence supporting that the speaker identified from the diarizing matches the speaker biographic data from the generating.

5. The computer implemented method of claim 1, the evaluating further comprising: increasing the confidence by a preconfigured unit responsive to ascertaining an evidence supporting that the speaker identified from the diarizing speaks the language from the identifying.

6. The computer implemented method of claim 1, further comprising: obtaining one or more input for reinforcement learning, wherein the one or more input updates the speaker label from the adjusting.

7. The computer implemented method of claim 1, the identifying comprising: transcribing the speech into a text; identifying sample words from the text; and looking up the sample words in respective dictionaries of a plurality of candidate languages.

8. The computer implemented method of claim 1, the identifying comprising: transcribing the speech into a text; identifying sample words from the text; looking up the sample words in respective dictionaries of a plurality of candidate languages; and assigning a certain candidate language of the plurality of candidate languages as the language of the speech in dependence on which of respective dictionaries yields a highest number of hits in response to the looking up the sample words.

9. The computer implemented method of claim 1, wherein the method includes further discovering a match in the frequently used words of the speech and of a second speaker group of the plurality of speaker groups; and including in the speaker biographic data second biographic feature data of a second preconfigured category of the preconfigured categories for the second speaker group based on the further discovering.

10. The computer implemented method of claim 1, wherein the method includes further discovering a match in the frequently used words of the speech and of a second speaker group of the plurality of speaker groups; and including in the speaker biographic data second biographic feature data of a second preconfigured category of the preconfigured categories for the second speaker group based on the further discovering, wherein each of the first preconfigured category and the second preconfigured category are demographic categories that are independent of the language of the speech.

11. The computer implemented method of claim 1, wherein the generating speaker biographic data includes generating a speaker biographic database (SBD) that includes speaker biographic data in the preconfigured categories, wherein the method comprises including in the speaker biographic data of the speaker biographic database (SBD) the biographic feature data of the first preconfigured category of the preconfigured categories for the first speaker group based on the discovering; wherein the method includes further discovering a match in the frequently used words of the speech and of a second speaker group of the plurality of speaker groups; and including in the speaker biographic data of the speaker biographic database (SBD) second biographic feature data of a second preconfigured category of the preconfigured categories for the second speaker group based on the further discovering, wherein each of the first preconfigured category and the second preconfigured category are demographic categories that are independent of the language of the speech, wherein the evaluating a confidence associated with a speaker as identified from the diarizing includes increasing the confidence based on known biographic data of the identified speaker as identified by the diarizing matching determined biographic data associated to a portion of the speech determined using the speaker biographic database (SBD).

12. The computer implemented method of claim 1, wherein the generating speaker biographic data includes generating a speaker biographic database (SBD) that includes speaker biographic data in the preconfigured categories, wherein the method comprises including in the speaker biographic data of the speaker biographic database (SBD) the biographic feature data of the first preconfigured category of the preconfigured categories for the first speaker group based on the discovering; wherein the method comprises further discovering a match in the frequently used words of the speech and of a second speaker group of the plurality of speaker groups; and including in the speaker biographic data of the speaker biographic database (SBD) second biographic feature data of a second preconfigured category of the preconfigured categories for the second speaker group based on the further discovering, wherein each of the first preconfigured category and the second preconfigured category are demographic categories that are independent of the language of the speech, wherein the evaluating a confidence associated with a speaker as identified from the diarizing includes decreasing the confidence based on known biographic data of the identified speaker as identified by the diarizing not matching determined biographic data associated to a portion of the speech determined using the speaker biographic database (SBD).

13. The computer implemented method of claim 1, wherein the preconfigured categories are preconfigured demographic categories independent of the language of the speech.

14. The computer implemented method of claim 1, wherein the generating speaker biographic data includes generating a speaker biographic database (SBD) that includes biographic data in the preconfigured categories, wherein the generating includes determining that a first portion of the speech has first frequently used words, and using an association structure that associates sets of frequently used words to preconfigured biographic features, setting an instance of a first preconfigured demographic category in the speaker biographic database (SBD) based on the association structure associating the first preconfigured demographic category to the first frequently used words, wherein the first preconfigured demographic category is independent of the language of the speech.

15. A computer program product comprising:
a computer readable storage medium readable by one or more processor and storing instructions for execution by the one or more processor for performing a method for identifying one or more speaker from a media file, comprising:
obtaining a media file having a speech by one or more speaker;
identifying the language of the speech by analyzing semantics of the language;
generating speaker biographic data in preconfigured categories by analyzing vocal characteristics and frequently used words of the speech;
diarizing the media file by adjusting boundaries of segments of the media file and identifying respective speaker for each segment;
evaluating a confidence associated with a speaker as identified from the diarizing;
adjusting a speaker label corresponding to the speaker to include the speaker, the language, and the speaker biographic data, responsive to determining that the confidence from the evaluating satisfies a preconfigured confidence threshold;
producing the speaker label resulting from the adjusting as speaker metadata for a segment corresponding to the speaker, wherein the generating includes comparing frequently used words of the speech with corresponding vocal characteristics and frequently used words of a plurality of speaker groups, wherein the preconfigured categories are preconfigured demographic categories;
discovering a match in the frequently used words of the speech and of a certain speaker group of the plurality of speaker groups; and
including in the speaker biographic data biographic feature data of a first preconfigured category of the preconfigured categories for the certain speaker group based on the discovering.

16. The computer program product of claim 15, the evaluating further comprising: increasing the confidence by a preconfigured unit responsive to ascertaining an evidence supporting that the speaker identified from the diarizing matches the speaker biographic data from the generating, wherein the preconfigured categories are preconfigured demographic categories independent of the language of the speech.

17. The computer program product of claim 15, the evaluating further comprising: increasing the confidence by a preconfigured unit responsive to ascertaining an evidence supporting that the speaker identified from the diarizing speaks the language from the identifying, wherein the preconfigured categories are preconfigured demographic categories independent of the language of the speech.

18. A system comprising:
a memory;
one or more processor in communication with the memory; and
program instructions executable by the one or more processor via the memory to perform a method for identifying one or more speaker from a media file, comprising:
obtaining a media file having a speech by one or more speaker;
identifying the language of the speech by analyzing semantics of the language;
generating speaker biographic data in preconfigured categories by analyzing vocal characteristics and frequently used words of the speech;
diarizing the media file by adjusting boundaries of segments of the media file and identifying respective speaker for each segment;
evaluating a confidence associated with a speaker as identified from the diarizing;
adjusting a speaker label corresponding to the speaker to include the speaker, the language, and the speaker biographic data, responsive to determining that the confidence from the evaluating satisfies a preconfigured confidence threshold;
producing the speaker label resulting from the adjusting as speaker metadata for a segment corresponding to the speaker, wherein the generating includes comparing frequently used words of the speech with corresponding vocal characteristics and frequently used words of a plurality of speaker groups, wherein the preconfigured categories are preconfigured demographic categories;
discovering a match in the frequently used words of the speech and of a certain speaker group of the plurality of speaker groups; and
including in the speaker biographic data biographic feature data of a first preconfigured category of the preconfigured categories for the certain speaker group based on the discovering.

\* \* \* \* \*